(12) United States Patent
Zavada et al.

(10) Patent No.: US 9,909,023 B2
(45) Date of Patent: Mar. 6, 2018

(54) INKJET INK FOR CERAMIC TILE DECORATION

(71) Applicant: Electronics for Imaging, Inc., Fremont, CA (US)

(72) Inventors: Mark Zavada, Wixom, MI (US); Natalia Martinez Borras, Castellon de la Plana (ES)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 15/181,308

(22) Filed: Jun. 13, 2016

(65) Prior Publication Data

US 2016/0376454 A1    Dec. 29, 2016

Related U.S. Application Data

(60) Provisional application No. 62/183,498, filed on Jun. 23, 2015.

(51) Int. Cl.

| | |
|---|---|
| *C09D 11/322* | (2014.01) |
| *B41J 3/407* | (2006.01) |
| *B41J 11/00* | (2006.01) |
| *B41M 5/00* | (2006.01) |
| *B28B 11/00* | (2006.01) |
| *B28B 11/04* | (2006.01) |
| *C09D 11/38* | (2014.01) |

(52) U.S. Cl.
CPC .......... *C09D 11/322* (2013.01); *B28B 11/001* (2013.01); *B28B 11/048* (2013.01); *B41M 5/007* (2013.01); *B41M 5/0023* (2013.01); *B41M 5/0047* (2013.01); *C09D 11/38* (2013.01); *B41J 3/407* (2013.01)

(58) Field of Classification Search
CPC ........ C09D 11/322; B41J 3/407; B41J 11/002
USPC ............................. 106/31.05, 31.9; 347/102
See application file for complete search history.

(56) References Cited

U.S. PATENT DOCUMENTS

| | | | |
|---|---|---|---|
| 6,464,765 B1 | 10/2002 | Garcia et al. | |
| 6,565,922 B2 | 5/2003 | Benet Garcia et al. | |
| 7,803,221 B2 * | 9/2010 | Magdassi | B41J 3/407 106/31.9 |
| 8,603,233 B2 | 12/2013 | Vignali et al. | |
| 9,446,990 B2 * | 9/2016 | Zavada | C04B 41/86 |
| 2006/0137567 A1 * | 6/2006 | Yadav | C09D 11/037 106/31.9 |
| 2008/0053333 A1 * | 3/2008 | Johnson | C09D 11/36 106/31.05 |
| 2010/0291362 A1 * | 11/2010 | Vignali | C09D 11/40 428/210 |
| 2012/0045583 A1 * | 2/2012 | Frenkel | G03F 7/2018 427/261 |
| 2014/0186524 A1 * | 7/2014 | Khaselev | C09D 11/30 427/123 |
| 2015/0056426 A1 * | 2/2015 | Grouchko | C09D 11/52 428/208 |
| 2016/0017161 A1 * | 1/2016 | Zavada | C09D 11/322 106/31.05 |
| 2016/0311231 A1 * | 10/2016 | Zavada | B41J 3/407 |

OTHER PUBLICATIONS

SR for PCT/US2016/039039 dated Sep. 7, 2016; 2 pages.*
Written Opinion of the International Search Authority dated Sep. 7, 2016 for PCT/US2016/039039; 5 pages.*

* cited by examiner

*Primary Examiner* — Helene Klemanski
(74) *Attorney, Agent, or Firm* — Perkins Coie LLP

(57) ABSTRACT

Embodiments of the invention combine pigmented and soluble salt digital ink technologies by dispersing water-soluble metal salts as particles in a non-aqueous inkjet ink fluid. The metal salts are dispersed as pigment-like particles, and not as a dissolved solute.

26 Claims, 1 Drawing Sheet

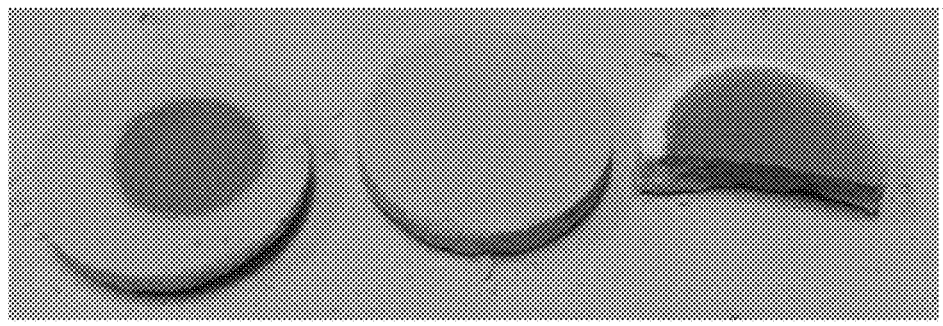

INKJET INK FOR CERAMIC TILE DECORATION

CROSS REFERENCE TO RELATED APPLICATIONS

This application claims priority to U.S. provisional patent application Ser. No. 62/183,498, filed Jun. 23, 2015, which is incorporated herein in its entirety by this reference thereto.

FIELD

The invention relates to printing inks. More particularly, the invention relates to inkjet ink for ceramic tile decoration.

BACKGROUND

Ceramic tiles can be decorated by digital printing with either (a) pigmented or (b) soluble salt based digital inks.

Pigmented digital inks for ceramic tile use metal, mixed metal oxides, metal-oxide, metal-sulfide, or metal-selenide particles as the ink chromophores. These pigment particles are dispersed within a liquid matrix to produce the inks. These pigmented inks are digitally printed to the surface of a glazed tile preferably, but not exclusively, prior to firing in a ceramic kiln. The purpose of the glaze layer is functional, i.e. waterproof, and aesthetic. Typical kiln temperatures for this decorative technique are 1000 to 1190 Celsius (° C.). No post-processing is required after the kiln firing step.

Soluble salt digital inks for technical porcelain ceramic tile use soluble metal compounds, rather than dispersed pigment particles, that convert into pigments by oxidation and/or reaction with other compounds in the green body during the firing in the kiln. The soluble metal compounds can be organometallic in nature, such as metal carboxylates, citrates, β-diketonates, cyclopentadienates, pyrazolates, imidazolates, naphthanate, glutonate, formate, thiocarboxylates, dithiocarboxylates, maleates, organophosphorus compounds, organosulfur compounds, and others, or purely inorganic in nature, such as metal chlorides, sulfates, sulfites, phosphates, phosphites, nitrates, nitrites, halides, perchlorates, metal oxoanions, and others. The metal salts are dissolved in a solvent, such as water and/or organic solvents, to produce the inks. The ink solutions are applied to the surface of an unglazed green tile porcelain body preferably, but not exclusively, using digital printer and print head technology. A green tile is a tile that has been formed, such as by a hydraulic press, but not fired and strengthened in a kiln. Typical application quantities are 15-50 grams per square meter (g/m$^2$) of ink per color. Additional solvent is often applied after ink application to help the ink penetrate at least 1 millimeter (mm) into the tile body. This additive is often referred to as a penetration or diffusion additive. The tile is fired in a kiln at porcelain temperatures (1190-1230° C.). After firing, the tile undergoes a polishing step, resulting in a glossy decorated technical porcelain tile.

SUMMARY

Embodiments of the invention combine pigmented and soluble salt digital ink technologies by dispersing water-soluble metal salts as particles in a non-aqueous inkjet ink fluid. The metal salts are dispersed as pigment-like particles, and not as a dissolved solute.

DRAWINGS

The FIGURE shows a series of tile pucks at various stages in a tile decoration process according to the invention.

DESCRIPTION

Various example embodiments will now be described. The following description provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this Description section.

Embodiments of the invention involve combining both pigmented and soluble salt digital ink technologies by dispersing the metal-containing compounds used in soluble salts as the pigment particles in a pigmented ink.

Current options for soluble salt inks in digital printing are incompatible with most digital print heads. This is due to the following:

(a) The high electrical conductivity of soluble salt inks, especially aqueous inks, which is known to cause print head jetting performance issues.

Embodiments of the invention concern an ink that avoids the electrical conductivity issue by treating the metal salts as pigments, instead of solutes. The resultant dispersion does not contain solubilized electrolytes, so the ink is not electrically conductive and does not cause print head performance problems.

(b) The corrosive nature of many solubilized salt compounds towards print head components. This includes (1) the presence of solubilized redox active metals, such as iron, which can interact with and degrade exposed metallic printer components, and (2) solvents that are aggressive toward organic print head components, such as polymers and adhesives, but that are necessary to maintain the soluble components in solution.

Embodiments of the invention concern an ink that is not corrosive towards current print heads by protecting any redox active metals by isolating the metals through the use of the pigmented ink design. This ink design allows for the use of organic fluids that are known to be compatible with printer and print head components while maintaining high metal contents.

(c) The instability of some metal complexes in solution, resulting in the decreased performance or degradation of a digital print head. This instability can be due to several mechanisms, such as (1) the precipitation of metal oxide particles due to long term air exposure and/or hydrolysis and condensation reactions, and (2) precipitation of insoluble compounds after various ligand exchange processes, especially in inks containing mixed metal or metal complexes Embodiments of the invention concern an ink that eliminates this instability by avoiding solubilized metal salts. The metal content of traditional soluble salt inks is limited by the solubility of the salt. In general, the greater the metal content in the ink, the stronger the color. For example, a 60% solution of cobalt(II) 2-ethylhexanoate by weight in mineral spirits contains about 10% (w/w) of cobalt metal.

Embodiments of the invention concern an ink that can stabilize higher metal contents by treating the salts as pigments rather than solutes. For example, a 60% dispersion of cobalt(II) acetate tetrahydrate in a water compatible glycol contains about 14% (w/w) of cobalt metal. A 60% dispersion of anhydrous cobalt(II) acetate contains about 20% (w/w) of cobalt metal.

Ink Components and Properties

Embodiments of the herein disclosed salt-particle ink may contain the following basic components:

1. Solids—metal salts, pigments, etc.
2. Liquids—organic solvents and fluids
3. Additives—dispersants, surfactants, fillers, fluid property modifiers Solids The metal-containing chromophore can be any metal complex that is soluble in water, but not in the liquid matrix comprising the ink fluid. An embodiment of the invention comprises a 1 to 60% dispersion of water soluble metal-containing solids in a fluid matrix. The soluble metal compounds may contain carboxylate, alkoxide, β-diketonate, cyclopentadienate, pyrazolate, imidazolate, naphthanate, thiocarboxylate, dithiocarboxylate, organophosphorus, organosulfur, and other moieties, and/or sulfate, sulfite, phosphate, phosphite, nitrate, nitrite, halide, perchlorate, hydroxide, ammonium, borate, silicate, metal oxoanion, and others. Examples include, but are not limited to, cobalt(II) acetate, nickel(II) sulfate, ferric ammonium citrate, chromium(III) acetate basic, nickel(II) acetate, etc.

Other solids, such as ceramic pigments and glaze materials, may be incorporated into the ink.

Liquids

The liquid matrix must consist of water soluble organics. This includes organics containing hydroxyl, ether, ester, amino, amido, carbonyl, formyl, mercapto, urea, carbonate, carbamate, thiocarbamate, carbamide, aromatic, sulfoxide, heterocyclic, heterocyclic aromatic, aliphatic and other organic moieties. Examples include, but are not limited to, isopropanol, propylene glycol, dimethylformamide, dimethylacetamide, diethylene glycol methyl ether, dipropylene glycol methyl ether, etc.

Additives

The salt particles may require a particle surfactant and/or dispersion additive to prevent the salt particles from settling. This includes, but is not limited to, polymeric dispersants, anionic surfactants, cationic surfactants, neutral surfactants and others.

EXAMPLES

Example 1: Iron Ink Composition

Table 1 shows the components for an iron ink composition.

TABLE 1

Iron Ink Composition

| Trade Name | Chemical | Iron Ink weight % |
| --- | --- | --- |
| DPM | Dipropylene glycol monomethyl ether | 55.0 |
| Solsperse 39000 | Polymeric hyperdispersant | 5.0 |
| Ferric Ammonium Citrate Brown | Iron salt/pigment | 40.0 |
| | | 100.0 |

Example 2: Chromium Ink Composition

Table 2 shows the components for a chromium ink composition.

TABLE 2

Chromium Ink Composition

| Trade Name | Chemical | Chromium Ink weight % |
| --- | --- | --- |
| DPM | Dipropylene glycol monomethyl ether | 55.0 |
| DISPERBYK-180 | Alkylol ammonium salt of a copolymer with acidic groups | 5.0 |
| Chromium(III) acetate basic | Chromium salt/pigment | 40.0 |
| | | 100.0 |

Ink Physical Properties

The physical properties of the ink are dependent on the limitations of the print head. Typical viscosities are between 1-100 centipoise at room temperature, salt concentrations between 5-80 percent by weight, surface tensions between 20-45 dynes/centimeter, and particle sizes under 10 microns.

Description of Decoration Process

A digital design is prepared and loaded into the digital printer. The digital printer applies the ink to the ceramic tile body using print head technology according to the digital design.

After the application of the ink, the printed tile surface is treated with a diffusion additive fluid, which acts as a solvent to carry the ink into the tile. This fluid is typically sprayed, poured, or inkjet printed on to the tile. This additive fluid must be compatible with the ink.

For tile manufacturers that use the soluble salt process, water is the preferred diffusion additive due to minimal cost, environmental concerns, and risk to worker health and safety. Because water can dissolve the ink fluids and metal-salts used in practicing the invention, water may be used as the diffusion additive. The dissolved metals are then carried into the tile in a manner similar to that of standard soluble salt inks. This is a defining step for the soluble salt ink process, which effectively dyes the digital image vertically through the tile. Dyeing the image throughout the tile prevents the image from future fading due to surface wear.

The tile is fired in a kiln, which develops the colors associated with the applied metal salts. Typical kiln temperatures are between 600 and 1300° C.

The tile may undergo a polishing step to produce the final product. This polishing step often involves using abrasive pads to create a smooth and uniform tile surface. Due to the application of the diffusion fluid additive mentioned above, which dyes the digital image vertically through the tile, the image is maintained as the surface layers are removed during polishing.

The FIGURE shows the steps described above, except that the ink was applied using a pipette instead of a digital process. In the FIGURE, at the left is a tile puck (20 mm diameter×4 mm thick) with metal salt-particle ink applied to the surface with a pipette. This ink consisted of dispersed pink cobalt(II) acetate tetrahydrate particles in a water-compatible fluid; the center tile puck shows the application of water as a diffusion additive dissolved and carried the metal salts into the tile (note that the salt particles dissolved and are no longer visible); the right tile puck was fired to 1200° C. for one hour, which developed the final color. The cobalt penetrated through the entire piece, which was 4 mm thick after firing. No polishing step is shown.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An inkjet ink for ceramic tile decoration, comprising:
a dispersion of water soluble metal-containing solids;
wherein a resultant dispersion does not contain solubilized electrolytes; and
a combination of pigmented and soluble salt digital inks comprising a 60% dispersion of cobalt(II) acetate tetrahydrate in a water compatible glycol containing about 14% (w/w) of cobalt metal.

2. The ink of claim 1, further comprising:
solids comprising any metal complex that is soluble in water, but not a liquid matrix comprising an ink fluid.

3. The ink of claim 2, further comprising:
said metal complex containing any of lithium, sodium, potassium, Group II element, Group IIB element, transition metal, lanthanide, aluminum, silicon, gallium, germanium, arsenic, selenium, indium, tin, antimony, lead, or bismuth.

4. The ink of claim 3, said soluble metal complex containing any of:
carboxylate, alkoxide, β-diketonate, cyclopentadienate, pyrazolate, imidazolate, naphthanate, thiocarboxylate, dithiocarboxylate, organophosphorus, organosulfur, and other moieties, and/or sulfate, sulfite, phosphate, phosphite, nitrate, nitrite, halide, perchlorate, hydroxide, ammonium, borate, silicate, and metal oxoanion.

5. The ink of claim 3, a soluble metal component comprising any of:
cobalt(II) acetate, ferric ammonium citrate, chromium acetate basic, and nickel(II) acetate.

6. The ink of claim 2, further comprising any of:
ceramic pigments and glaze materials.

7. The ink of claim 2, further comprising:
a liquid matrix consisting of water soluble organics.

8. The ink of claim 7, said water soluble organics comprising any of:
hydroxyl, ether, ester, amino, amido, carbonyl, formyl, mercapto, urea, carbonate, carbamate, thiocarbamate, carbamide, aromatic, sulfoxide, heterocyclic, heterocyclic aromatic, aliphatic and other organic moieties.

9. The ink of claim 7, said water soluble organics comprising any of:
isopropanol, propylene glycol, dimethylformamide, dimethylacetamide, and diethylene glycol methyl ether.

10. The ink of claim 2, further comprising:
a particle surfactant and/or dispersion additive to maintain a stable state of dispersion.

11. The ink of claim 10, said particle surfactant and/or dispersion additive comprising any of:
polymeric dispersants, anionic surfactants, cationic surfactants, and neutral surfactants.

12. The ink of claim 1, said ink having a viscosity between 1-100 centipoise at room temperature, salt concentrations between 5-80 percent by weight, surface tensions between 20-45 dynes/centimeter, and particle sizes under 10 microns.

13. An inkjet ink for ceramic tile decoration, comprising:
a dispersion of water soluble metal-containing solids;
wherein a resultant dispersion does not contain solubilized electrolytes; and
a combination of pigmented and soluble salt digital inks comprising a 60% dispersion of anhydrous cobalt(II) acetate containing about 20% (w/w) of cobalt metal.

14. The ink of claim 13, further comprising:
solids comprising any metal complex that is soluble in water, but not a liquid matrix comprising an ink fluid.

15. The ink of claim 14, further comprising:
said metal complex containing any of lithium, sodium, potassium, Group II element, Group IIB element, transition metal, lanthanide, aluminum, silicon, gallium, germanium, arsenic, selenium, indium, tin, antimony, lead, or bismuth.

16. The ink of claim 15, said soluble metal complex containing any of:
carboxylate, alkoxide, β-diketonate, cyclopentadienate, pyrazolate, imidazolate, naphthanate, thiocarboxylate, dithiocarboxylate, organophosphorus, organosulfur, and other moieties, and/or sulfate, sulfite, phosphate, phosphite, nitrate, nitrite, halide, perchlorate, hydroxide, ammonium, borate, silicate, and metal oxoanion.

17. The ink of claim 15, a soluble metal component comprising any of:
cobalt(II) acetate, ferric ammonium citrate, chromium acetate basic, and nickel(II) acetate.

18. The ink of claim 14, further comprising any of:
ceramic pigments and glaze materials.

19. The ink of claim 14, further comprising:
a liquid matrix consisting of water soluble organics.

20. The ink of claim 19, said water soluble organics comprising any of:
hydroxyl, ether, ester, amino, amido, carbonyl, formyl, mercapto, urea, carbonate, carbamate, thiocarbamate, carbamide, aromatic, sulfoxide, heterocyclic, heterocyclic aromatic, aliphatic and other organic moieties.

21. The ink of claim 19, said water soluble organics comprising any of:
isopropanol, propylene glycol, dimethylformamide, dimethylacetamide, and diethylene glycol methyl ether.

22. The ink of claim 14, further comprising:
a particle surfactant and/or dispersion additive to maintain a stable state of dispersion.

23. The ink of claim 22, said particle surfactant and/or dispersion additive comprising any of:
polymeric dispersants, anionic surfactants, cationic surfactants, and neutral surfactants.

24. The ink of claim 13, said ink having a viscosity between 1-100 centipoise at room temperature, salt concentrations between 5-80 percent by weight, surface tensions between 20-45 dynes/centimeter, and particle sizes under 10 microns.

25. A ceramic tile decoration method, comprising:
preparing a digital design and loading said digital design into a digital printer;

said digital printer applying ink to a ceramic tile body using a print head according to the digital design, the ink comprising a dispersion of water soluble metal-containing solids, wherein a resultant dispersion does not contain solubilized electrolytes, and the ink comprising a combination of pigmented and soluble salt digital inks comprising a 60% dispersion of cobalt(II) acetate tetrahydrate in a water compatible glycol containing about 14% (w/w) of cobalt metal;

after application of the ink, treating a printed tile surface with a diffusion additive fluid to dissolve metal-salt particles within said ink, wherein the dissolved metals are then carried into the tile;

firing the tile in a kiln at temperatures between 600 and 1300° C. to develop colors associated with the applied metal salts; and polishing the tile to produce a final product.

26. A ceramic tile decoration method, comprising:

preparing a digital design and loading said digital design into a digital printer;

said digital printer applying ink to a ceramic tile body using a print head according to the digital design, the ink comprising a dispersion of water soluble metal-containing solids, wherein a resultant dispersion does not contain solubilized electrolytes, and the ink comprising a combination of pigmented and soluble salt digital inks comprising a 60% dispersion of anhydrous cobalt(II) acetate containing about 20% (w/w) of cobalt metal;

after application of the ink, treating a printed tile surface with a diffusion additive fluid to dissolve metal-salt particles within said ink, wherein the dissolved metals are then carried into the tile;

firing the tile in a kiln at temperatures between 600 and 1300° C. to develop colors associated with the applied metal salts; and polishing the tile to produce a final product.

\* \* \* \* \*